(12) United States Patent
Frank et al.

(10) Patent No.: US 9,324,462 B2
(45) Date of Patent: Apr. 26, 2016

(54) REACTOR HEAD SEISMIC SUPPORT TIE ROD SYSTEM

(75) Inventors: Courtney B. Frank, Butler, PA (US); Michael D. Conrad, Blairsville, PA (US); Jeffrey C. Himler, Greensburg, PA (US); Daniel J. Erdman, West Middlesex, PA (US); Michelle Heinz Carnicelli, Mars, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1601 days.

(21) Appl. No.: 12/834,963

(22) Filed: Jul. 13, 2010

(65) Prior Publication Data

US 2012/0014493 A1    Jan. 19, 2012

(51) Int. Cl.
| | |
|---|---|
| *G21C 19/00* | (2006.01) |
| *G21C 9/00* | (2006.01) |
| *G21D 1/02* | (2006.01) |
| *G21C 13/024* | (2006.01) |

(52) U.S. Cl.
CPC ............... *G21C 9/00* (2013.01); *G21C 13/024* (2013.01); *G21C 19/00* (2013.01); *G21D 1/02* (2013.01); *Y02E 30/40* (2013.01)

(58) Field of Classification Search
CPC ........ G21C 9/00; G21C 13/024; G21C 19/00; G21D 1/02; Y02E 30/40
USPC ......................................................... 376/260
See application file for complete search history.

(56) References Cited

U.S. PATENT DOCUMENTS

| | | | |
|---|---|---|---|
| 3,625,819 A * | 12/1971 | Sodergard | 376/371 |
| 4,173,513 A | 11/1979 | Obermeyer et al. | |
| 4,666,657 A * | 5/1987 | Altman | 376/234 |
| 4,678,623 A | 7/1987 | Malandra et al. | |
| 4,828,789 A | 5/1989 | Hankinson et al. | |
| 4,830,814 A * | 5/1989 | Altman | 376/287 |
| 5,683,216 A * | 11/1997 | Erbes | 411/120 |
| 5,699,397 A * | 12/1997 | Jensen | 376/463 |
| 5,742,652 A | 4/1998 | Hankinson et al. | |
| 6,061,415 A | 5/2000 | Harkness et al. | |
| 6,067,823 A * | 5/2000 | Ostergren | 70/210 |
| 6,546,066 B2 * | 4/2003 | Baliga et al. | 376/263 |
| 6,639,960 B2 | 10/2003 | Harkness et al. | |
| 7,158,605 B2 | 1/2007 | Harkness et al. | |
| 2010/0098205 A1 * | 4/2010 | Kang et al. | 376/263 |

FOREIGN PATENT DOCUMENTS

JP    2001221882 A    8/2001

OTHER PUBLICATIONS

Supplementary European Search Report dated Mar. 24, 2015 for EP11807253.7.

* cited by examiner

*Primary Examiner* — Frank J McGue
(74) *Attorney, Agent, or Firm* — Richard J. Coldren; Westinghouse Electric Company LLC (57) ABSTRACT

A quick disconnect for a control rod drive mechanism seismic support tie rod system that is remotely operable from a nuclear power plant's operating deck. A wall mounted anchor in the reactor cavity contains one half of a disconnect coupling that interfaces with the other half of the disconnect coupling on the ends of the tie rods employing a remote winching system that is actuated from the top of the reactor head assembly. A latching mechanism is then actuated from the refueling cavity operating deck to lock the tie rod in place and prevent displacement during a seismic or pipe break event. The tie rod may similarly be unlocked from the wall anchor and raised above the reactor head assembly as part of a reactor head disassembly operation to gain access to the core of the reactor vessel for refueling.

22 Claims, 11 Drawing Sheets

REACTOR HEAD SEISMIC SUPPORT TIE ROD SYSTEM

BACKGROUND OF THE INVENTION

1. Field of the Invention

This invention pertains generally to control rod drive mechanism seismic supports for nuclear power plants and more particularly to a quick disconnect seismic support tie rod system.

2. Description of the Related Art

In conventional reactors, the head package includes the pressure vessel head which seals the reactor vessel, control rod drive mechanisms which are used to raise and lower control rods in the core of the reactor, a seismic platform adjacent the upper ends of the control rod drive mechanisms, which laterally restrains the drive mechanisms, and various cables for operation of the control rod drive mechanisms. A missile shield, which conventionally was formed of a concrete slab, is positioned above the head package to protect the containment housing and associated equipment from penetration by any of the control rod drive mechanisms in the event of a major pipe break. The problems associated with such conventional head packages are more fully described in U.S. Pat. No. 4,678,623, issued Jul. 7, 1987, and assigned to the assignee of this invention. In such conventional plants, the large concrete slabs installed above the reactor vessel to act as a missile shield must be removed and stored prior to head disassembly and refueling of the reactor, and then must be replaced after the refueling and head reassembly. Such operations affect overall refueling time and radiation exposure and require space in the containment area for placement of the missile shield slabs when removed from the position above the reactor vessel.

In order to reduce the refueling time, personal exposure and space requirements, an improved system, designated as an integrated head package was developed which incorporates an integral missile shield and head lift rig. The missile shield is in the form of a perforated circular plate which is directly attached to a head lift rig. Such an integral head package system is described in U.S. Pat. No. 4,830,814, issued May 16, 1989 and assigned to the assignee of this invention.

Figure 1:
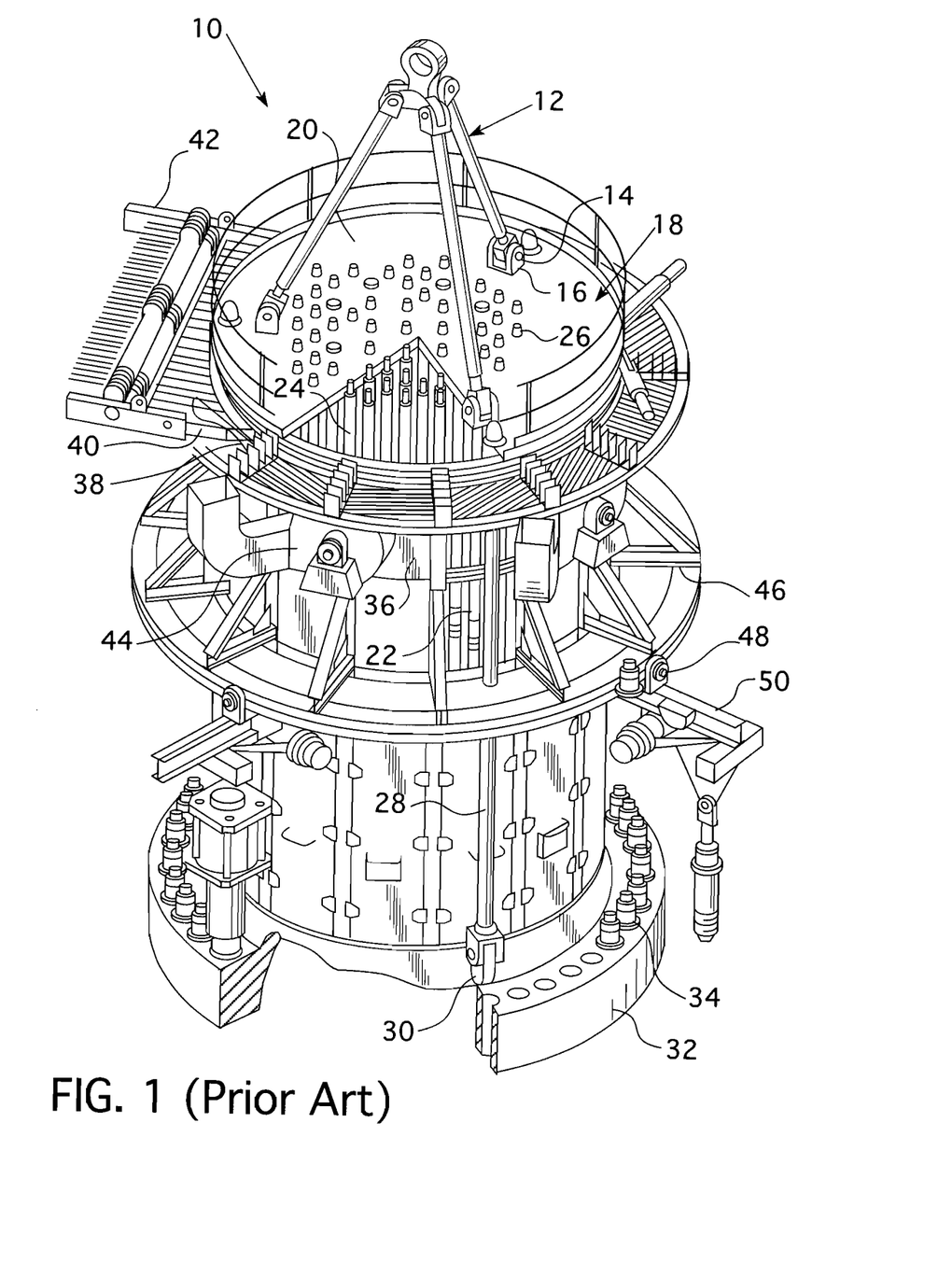
FIG. 1 is a perspective view of a prior art reactor vessel head assembly.

As described therein, and illustrated in FIG. 1 of the present drawings, an integral head package 10 includes a three-legged head lifting rig 12 that is pin connected at 14 by lift lugs 16, to a missile shield assembly 18. The perforated circular plate 20 that forms the missile shield 18 acts as a spreader for the head lift load, and as a seismic support for the tops of the control rod drive mechanisms 22, with rod travel housings extensions 24 of the control rod drive mechanisms protruding through apertures 26 in the circular plate 20. The missile shield 18 interfaces with the tops of the control rod travel housings 22 which limits the overall vertical travel (and impact force) of a missile before it impacts the shield. The impact load of the missile against the underside of the perforated plate 20 is transmitted to head lift rods 28, through vessel head lift lugs 30 secured to the vessel head 32, and closure studs 34 to the vessel head 32, and ultimately to the vessel supports. A cooling shroud 36 surrounds the control rod drive mechanisms 22, while electric cabling 38 is routed from the top of the control rod drive mechanisms 22 to a connector plate 40 and then along a cable tray 42 to respective cable terminations. Cooling fans 44 circulate air within the shroud 36 to transfer waste heat from the control rod drive mechanisms 22. Hoist supports 46, and trolleys 48 on hoist assemblies 50 are used to position stud tensioner tools and stud removal tools during refueling operations.

The integrated head package and variants of the design which have since evolved, were a marked improvement over conventional head package designs, and are adaptable for retrofitting existing reactors or for incorporation into new reactor designs as will be described hereafter. However, there is still room for improvement in reducing the number of steps that have to be performed in the critical path of a refueling outage. For example, many nuclear power plants have control rod drive mechanism seismic support tie rods. Typically, there are five to six tie rods which are pinned at the reactor head assembly attachment, and pinned at a refueling cavity wall mounted anchor. During plant refueling, the tie rods need to be removed in order to move the vessel head assembly to the head storage stand. The ends of the tie rods that are attached to the wall mounted anchors (and in most cases the head assembly mounted ends also) are disconnected and reconnected by operators in a man basket supported by the overhead polar crane. Because these activities utilize the polar crane, which is also required for numerous refueling activities, they are considered to be in the critical path of the refueling outage. Any reduction in critical path time results in significant savings in the form of the refueling schedule and electric utility dollars.

Accordingly, a new tie rod support system is desired that can reduce the number of steps required to disconnect the tie rod wall anchors from the vessel head so that the vessel head can be removed.

Furthermore, a new tie rod support system is desired that can remove the disconnection of the tie rods from the refueling outage critical path.

Additionally, such a system is desired that can enable the vessel head assembly to be removed from the vessel with the tie rods attached to the head assembly.

SUMMARY OF THE INVENTION

These and other objects are achieved by the control rod drive mechanism seismic support tie rod system of this invention that has the tie rod ends that engage anchors on the vessel cavity walls and are connected to the anchors with a locking mechanism that is directly operable from a location remote from the anchor to lock or unlock the tie rod from engagement with the anchor. In one preferred form, the locking mechanism is latchable in a locked position to lock the tie rod into engagement with the anchor. In a second position, the locking mechanism is preferably latchable in an unlocked position to maintain the locking member in an open state so that the tie rod can be removed. In one embodiment, the end of the tie rod that engages the anchor includes a lateral extension that extends from the tie rod end in a first direction and is engaged by a pivotable hook on the locking mechanism when the locking mechanism is in a locked position. In the foregoing embodiment, the pivotable hook has a distal end that is spaced from a pivot coupling on the locking mechanism. The distal end is pivotably connected to an actuation arm which is operable from the location remote from the anchor to lock or unlock the end of the tie rod. Preferably, in the foregoing embodiment, a stationary arm, over which the actuation arm rides, has a plurality of holes along a length thereof, at least one of which mates with a corresponding hole in the actuation arm when the actuation arm moves the locking mechanism into the locked position and into the unlocked position. In still another embodiment, the end of the tie rod that engages the wall anchor includes a second lateral extension that extends from the tie rod end in a second direction that is opposite the first direction and is engaged by a clevis on the locking mechanism.

Preferably, the nuclear containment facility employing this invention includes an operating deck within the vicinity of the vessel cavity. A generally vertical oriented wall extends down from the operating deck into the cavity, opposed from at least a portion of the reactor vessel, on which the tie rod anchors are mounted. The anchors are preferably secured at or between a foot to two feet (30.5-61 cm.) below the operating deck.

Preferably, one end of the tie rods are pivotably connected to the reactor vessel so that the tie rods can pivot up into a generally vertical position when they are released from the anchors. Desirably, a winching system is located on the reactor vessel head assembly for raising and lowering the tie rods.

In still another embodiment wherein the anchor includes a plate that extends generally toward the reactor vessel, substantially in line with the corresponding tie rod that it connects with, the anchor has a first dowel portion extending laterally from one side of the plate and a second dowel portion extending from an opposite side of the plate. The adjacent end of the tie rod is formed to slip over and engage the first and second dowel portions from above when the tie rods are pivoted down at the reactor vessel head assembly. The plate has a locking bar that is operable from a remote location on an operating deck of the containment to move over the tie rod end when the tie rod end fully engages the first and second dowel portions to lock the tie rod end to the anchor. Preferably, the tie rod end is configured as a fork with two tines spaced to receive the plate therebetween. Each of the tines has a downward facing clevis opening that receives a corresponding dowel portion as the tie rod is pivoted downward over the plate. Desirably, a locking bar is operable from the remote location on the operating deck to rotate between an open position wherein the locking bar lies over the top of the plate, clear of the tines of the tie rod end and a closed position, approximately 90 degrees from the open position, where the locking bar lies over each of the tines. The locking bar is preferably rotated by a long-handled tool that has a forked lower end that grips an upwardly extending wall on the locking bar. Desirably, the locking bar can be latched in either or both the open or closed position. Preferably, the clevis opening in the tie rod end has a taper at a lower end of at least one wall of the clevis opening slot to facilitate alignment over the dowel pin portions.

In still another embodiment, the anchor includes an engagement interface which is angularly adjustable to align with the corresponding tie rod. Preferably, the angular adjustment is in the vertical orientation.

BRIEF DESCRIPTION OF THE DRAWINGS

A further understanding of the invention can be gained from the following description of the preferred embodiments when read in conjunction with accompanying drawings in which.

DESCRIPTION OF THE PREFERRED EMBODIMENT

Figure 2:
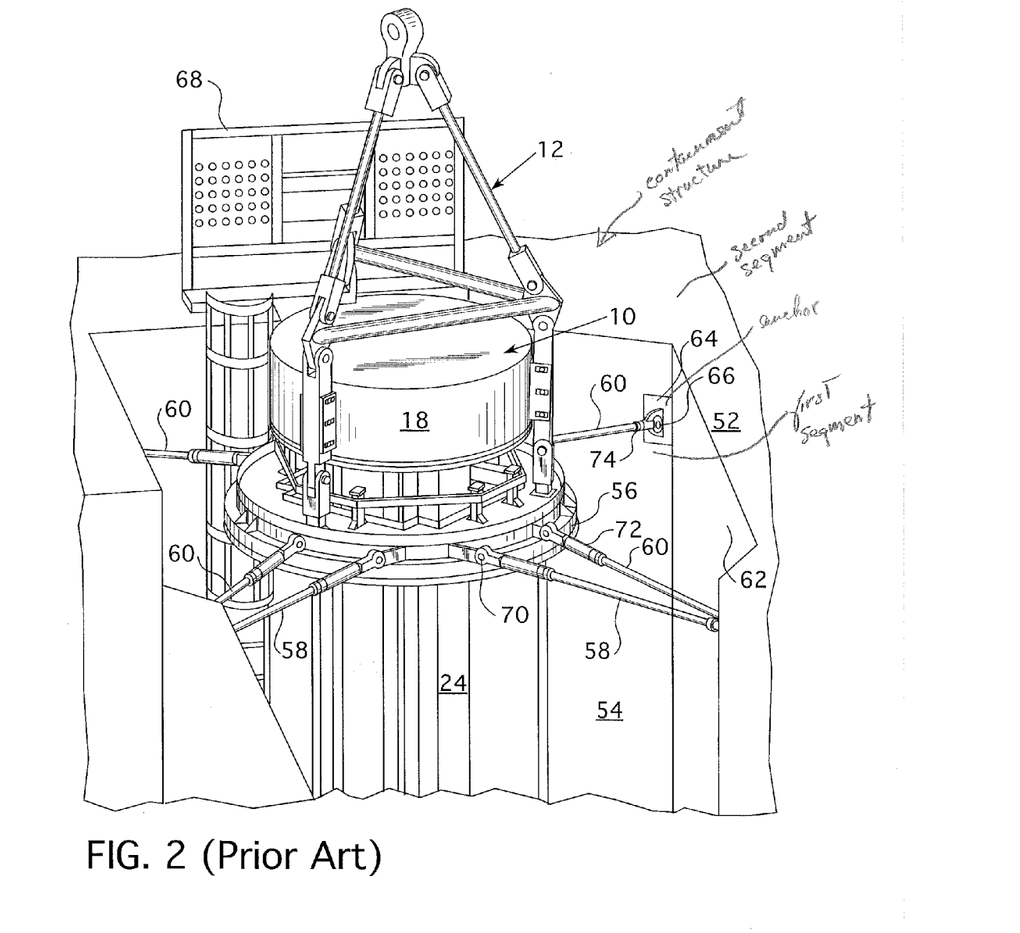
FIG. 2 is a perspective view of a portion of the reactor vessel head assembly anchored to the reactor vessel cavity sidewalls by tie rods, which shows a portion of the operation deck.
Figure 3:
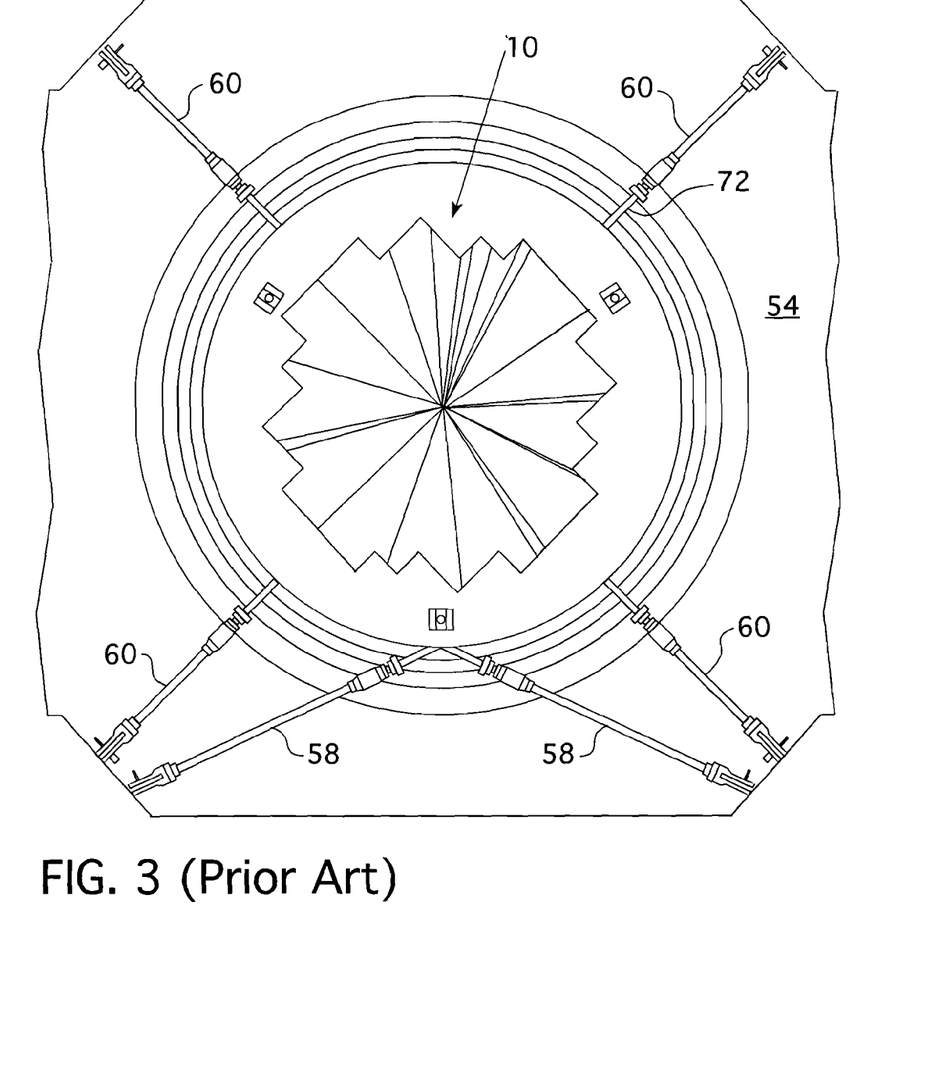
FIG. 3 is a planned view of the reactor vessel cavity showing the reactor vessel head assembly anchored to the vessel cavity sidewalls by the tie rods.

FIG. 2 shows a perspective view of the portion of the operating deck 52 which surrounds the reactor vessel cavity 54 and a portion of the integrated head package 10 showing a missile shield 18 seated over the control rod travel housing extensions 24 and coupled to the lifting rig 12 that was previously described with respect to FIG. 1. The integrated head package also includes a seismic ring 56 that is secured around the control rod travel housing extensions 24 and is secured against lateral movement by the tie rods 58 and 60 which are connected between the seismic ring 56 and the vessel cavity wall 62. As can be seen from plan view in FIG. 3 of this prior art arrangement, six tie rods, four radial tie rods 60 and two tangential tie rods 58 secure the control rod travel housing extensions 24 from lateral movement. The tie rods are connected at one end 72 to the seismic ring 56 on the integrated head package 10 through a pinned coupling 70 and are connected at another end 74 to the anchor 64 secured to the vessel cavity wall 62 through a similar connection 66. As previously mentioned, during plant refueling, these tie rods 58 and 60 have to be removed in order to move the vessel head assembly 10 to the head storage stand. The end of the tie rods 74 that is attached to the wall mounted anchor 64 (and in some cases the head assembly mounted end 72 also) is disconnected and reconnected by operators in a man basket supported by the overhead polar crane. The quick disconnect control rod drive mechanism seismic support tie rod system of this invention eliminates the need to use the overhead polar crane for this purpose and thus takes this task outside of the critical path.

Figure 4:
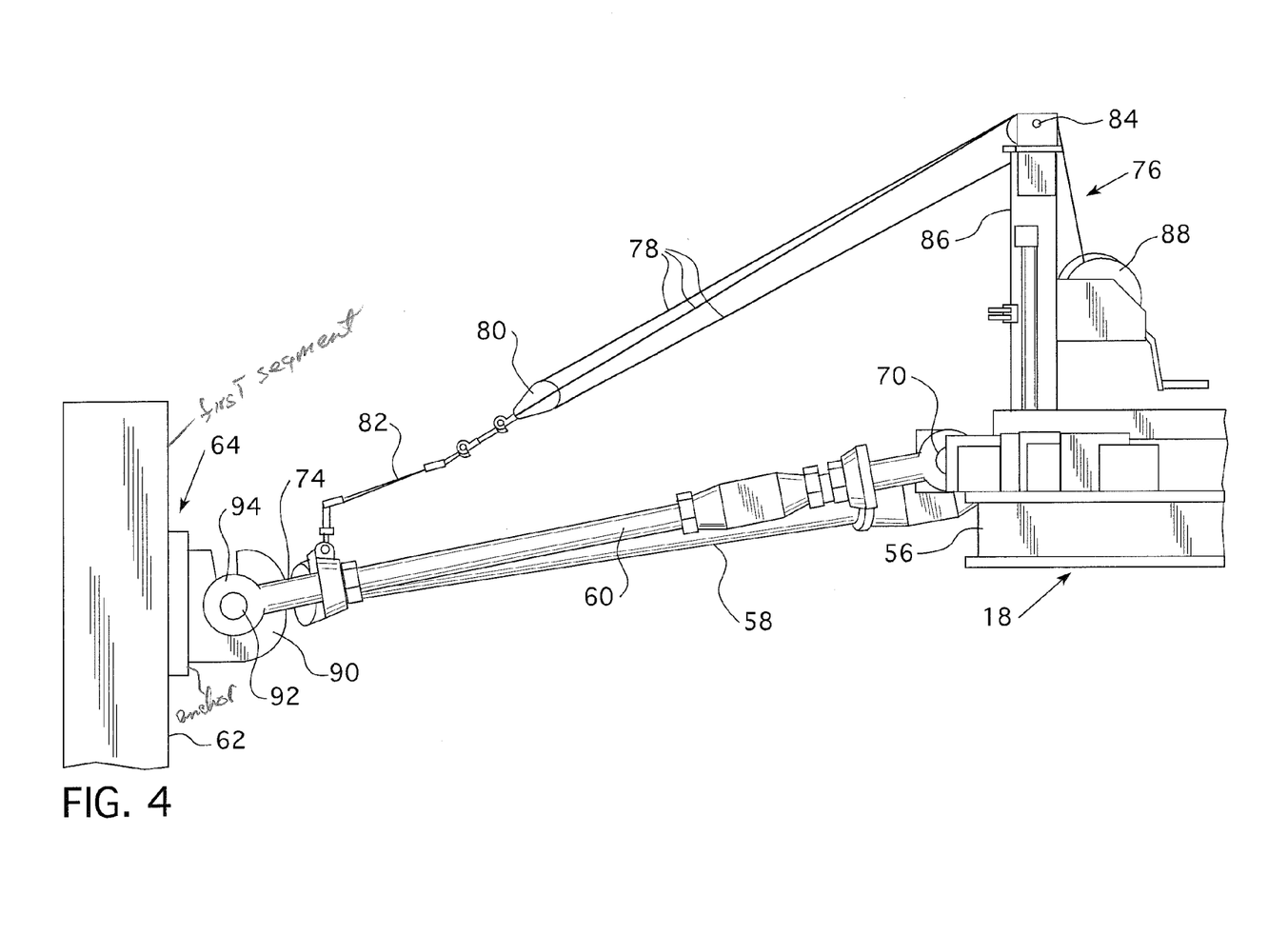
FIG. 4 is a perspective view of one embodiment of the tie rod system of this invention extending between the vessel cavity wall and an upper portion of the reactor vessel head assembly.

One embodiment of the quick disconnect control rod drive mechanism seismic support tie rod system of this invention is illustrated in FIG. 4 and includes a winching system 76 attached to the head assembly 10 which is used to raise and lower the tie rods 58 and 60 without the use of a man basket.

The tie rods 58 and 60 are secured to the head assembly structure through the pivot connection 70 and remain with the head assembly 10 for the move to the head storage stand. In this embodiment, a wall anchor attachment 64 includes a slotted clevis 90 which is designed to receive a laterally extending dowel 92 on the forward end 74 of the tie rod 58, 60. The dowel 92 spans between two spaced circular brackets 94 that are supported at the end of the tie rod 58, 60 with the circular brackets 94 fitting on either side of the clevis 90 when the dowel 92 is seated in the slot of the clevis. A locking mechanism (more clearly shown in FIGS. 7, 8 and 9), is actuated from the operating deck 52 and is designed to prevent the tie rods 58, 60 from becoming displaced from the clevis 90 during a seismic or pipe break activity.

Referring more specifically to FIG. 4, it can be seen that the winch system 76 is supported on a post 86 that is mounted on the seismic ring 56. A winch crank 88 is mounted on the post 86 and has a cable 78 that extends from the post 86 to a pulley system 80 which is connected to the forward end 70 of the tie rod 58, 60 through a forward linkage 82. The winch cable 78 extends from the post 86 to the pulley system 80 and back and around guide wheels 84 on the post 86 with the end of the cable connected to the crank 88 so that when the crank is turned in a direction to draw in the cable 78 the tie rod 58, 60 is raised toward the vertical axis lifting the dowel out of the clevis, assuming the locking mechanism 96 is in an open position. Conversely, when the crank 88 is turned in a direction to let out the winch cable 78, the tie rods 58, 60 is lowered to be received in the slotted clevis 90 when the plant is in a cold start-up condition. A winching system 76 is provided for each tie rod 58, 60. Preferably, the winch system 76 includes a lock, such as on the crank 88 that will lock the winch cable 78 in position when the tie rods 58, 60 are in their fully withdrawn position so the tie rods can be removed with the reactor vessel head to the head stand.

Figure 5:
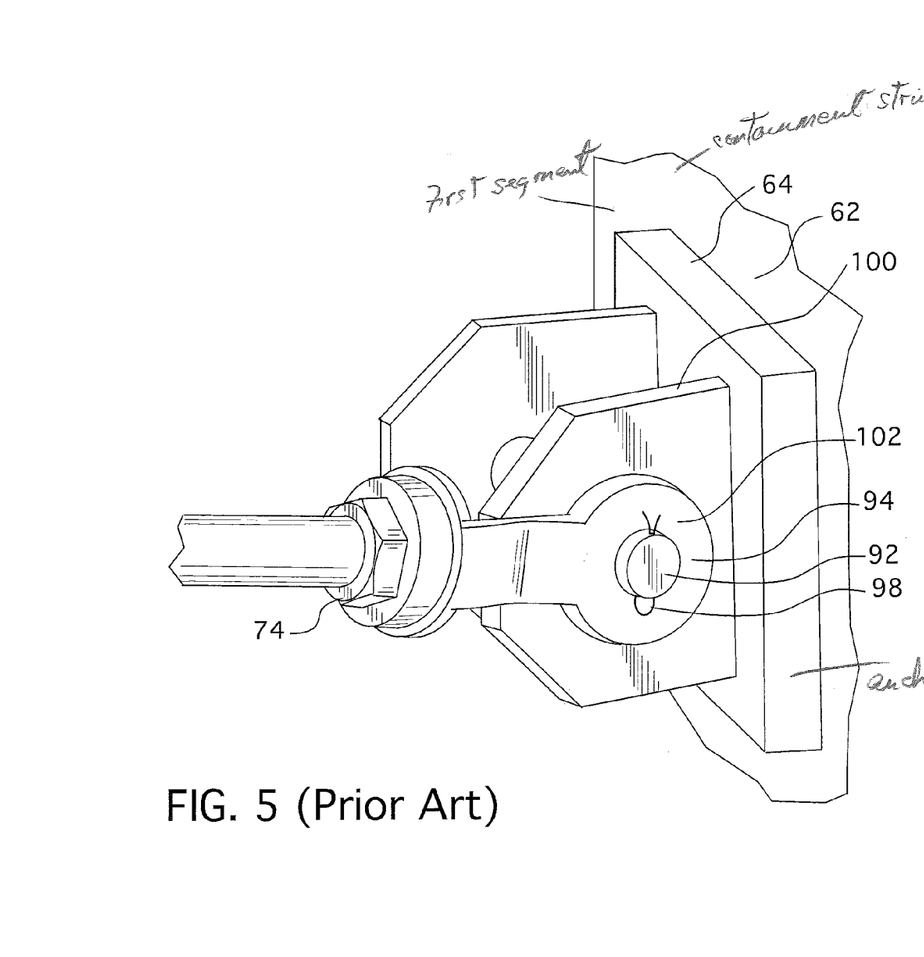
FIG. 5 is a perspective view of a prior art coupling between a tie rod end and the wall anchor.

The design of the locking mechanism 96 of this invention is more fully illustrated in FIGS. 6-9. To appreciate the improvement of this invention, it is helpful to first understand the prior art coupling between the end of the tie rods 74 and the anchor 64 illustrated in FIG. 5. The anchor plate 64 of the prior art has two spaced, parallel plates that extend orthogonally from a base plate which is affixed to the reactor cavity wall 62. The spaced parallel plates 100 have aligned holes through which a dowel 92 passes. The design of the end 74 of the tie rod is very similar to that of the current invention shown in FIGS. 6 and 7 in which the end is formed from a split yoke that is designed to receive at least one of the parallel plates therebetween. The split yoke 102 of the prior art, shown in FIG. 5, has an enlarged circular rounded end 94 on each of the fork tine terminations of the split yoke. The rounded ends 94 have a central opening through which the dowel 92 passes and secures the split yoke 102 to the spaced parallel plate 100. The dowel is affixed on one side of the parallel plates 100 with an enlarged end and on the other side with a cotter pin 98.

Figure 6:
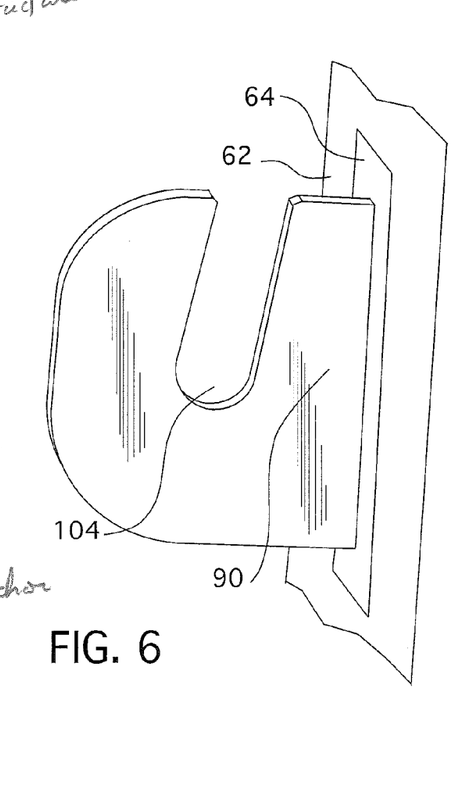
FIG. 6 is a side view of a wall anchor clevis of the embodiment of this invention illustrated in FIG. 4.

One side of the anchor plate 64 of the embodiment of this invention described above, is illustrated in the side view shown in FIG. 6. The anchor plate 64 which is attached to the reactor cavity wall 62 has a slotted clevis 90 that extends orthogonally into the reactor well. The slotted opening 104 in the clevis 90 is designed to receive the dowel 92 on the tie rod end 74 between the two rounded ends 94 of the split yoke 102 of the tie rod end 74.

Figure 7:
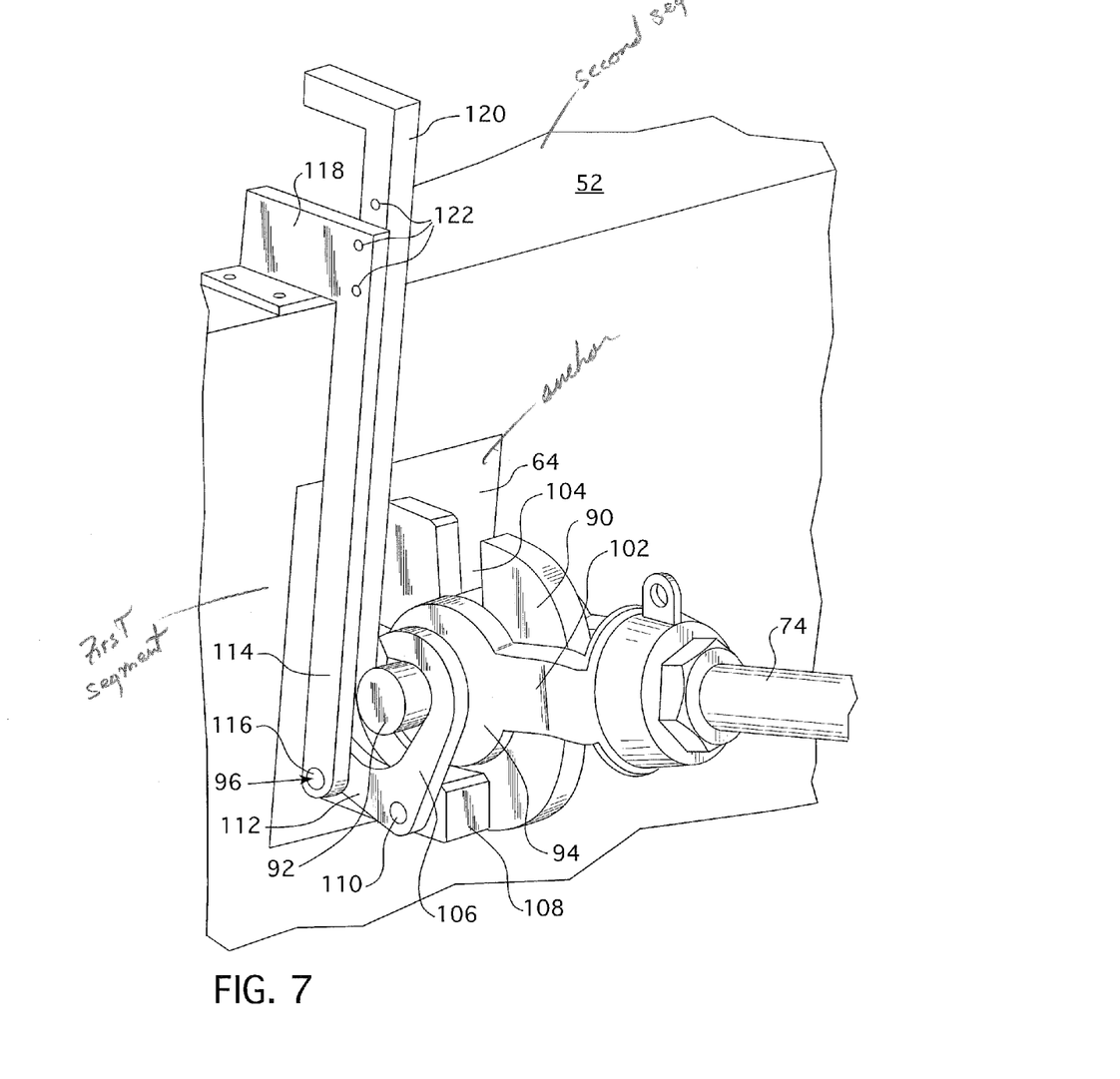
FIG. 7 is a perspective view of the coupling between the tie rod end and the wall anchor of the embodiment of this invention illustrated in FIGS. 4 and 6.
Figure 8:
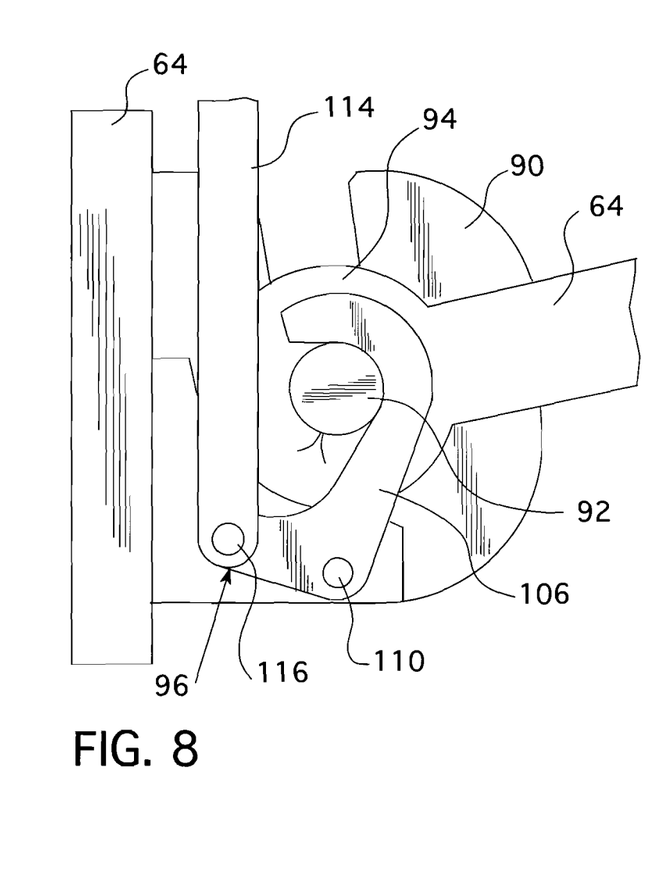
FIG. 8 is a side view of the coupling, illustrated in FIG. 7, between the tie rod end and the wall anchor from the side of the pivotable hook with the hook in a locked position.

A better view of the locking mechanism 96 of the anchor assembly 64 of the foregoing embodiment is shown in FIG. 7. As previously stated, the tie rod end 74 is substantially similar to the prior art tie rod end except the dowel 92 extends laterally from the rounded end 94 of the split yoke 102 in a direction away from the slotted opening 104 in the clevis 90 and is captured by the locking mechanism 96 in the closed position as will be more fully explained hereafter. The dowel 92 in this embodiment can be permanently affixed to both rounded ends 94 of the split yoke tie rod end 102. Alternately, one of the tines of the split fork could be removed and the dowel 92 could extend out of one or both sides of the rounded end 94 so long as the dowel 92 was captured within the clevis slot 104 and the locking mechanism 96 as explained hereafter.

Figure 9:
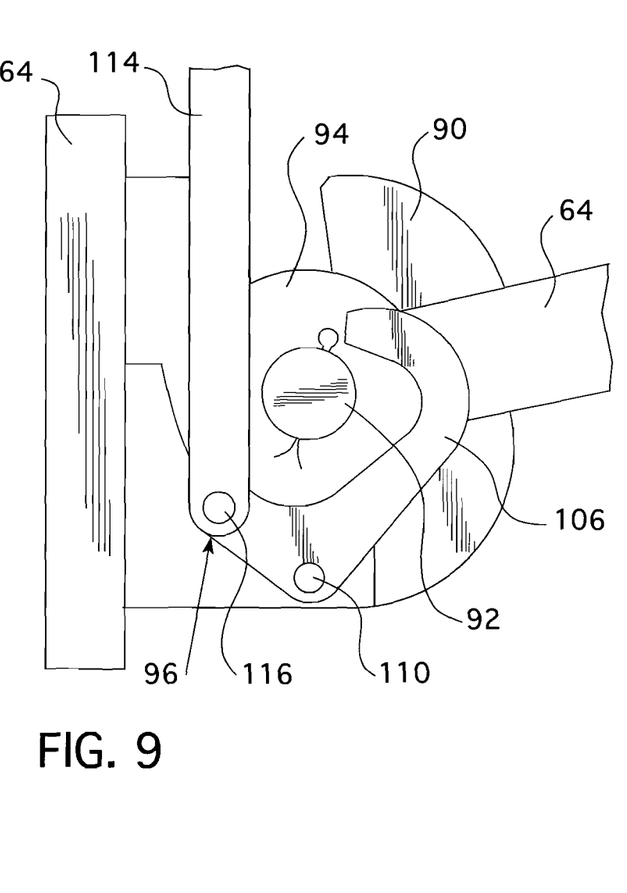
FIG. 9 shows a side view of FIG. 8 with the pivotable hook in an open position.

The locking mechanism 96 includes a pivotable hook 106 that is attached to a base spacer member 108 at a pivot point 110. The base spacer member 108 is desirably connected to both the base anchor plate 64 and the slotted clevis 90 and is sized to capture the rounded end 94 of at least one tine of the split yoke 102 of the tie rod end 74 between the pivotable hook 106 and the clevis 90. The distal end 112 of the pivotable hook 106 is connected to the end of an actuation arm 114 through a second pivot point 116. The actuation arm 114 extends from the pivot point 116 vertically to a height above the operating deck 52 where the actuation arm 114 terminates in a horizontal handle 118 that extends over the operating deck 52. The operating deck is typically one and one-half feet to two feet (45.72-60.96 cm) above the wall mounted anchor 64. The actuation arm 114 rides over a stationary arm 120 that extends along the anchor wall plate 64, along side the slotted clevis 90. The stationary arm has a locking pin hole 122 which mates with corresponding holes 122 in the actuation arm 114 to receive a locking pin to lock the actuation arm 114 in position when in either the open or, closed orientation. Alternately, the stationary arm can have two holes that will mate with a single hole in the actuation arm. Thus, when the actuation arm 114 is pulled up in the vertical direction, the pivotable hook 106 rotates around the pivot 116 to an open position as shown in FIG. 9. Similarly, when the actuation arm 118 is pushed down in the vertical direction the pivoted hook 106 rotates about the pivot 110 and second pivot point 116 to the closed position illustrated in FIG. 8, locking the dowel 92 in the slot 104 of the clevis 90. Thus, the locking mechanism 96 pins the tie rod end 74 to the wall mounted anchor 64 and can be locked in place in either the open or closed position from the operating deck elevation 52 using locking pins inserted through the holes 122. The position locking pins utilize a lanyard to prevent them from being dropped into the reactor cavity 54 or misplaced.

Figure 10:
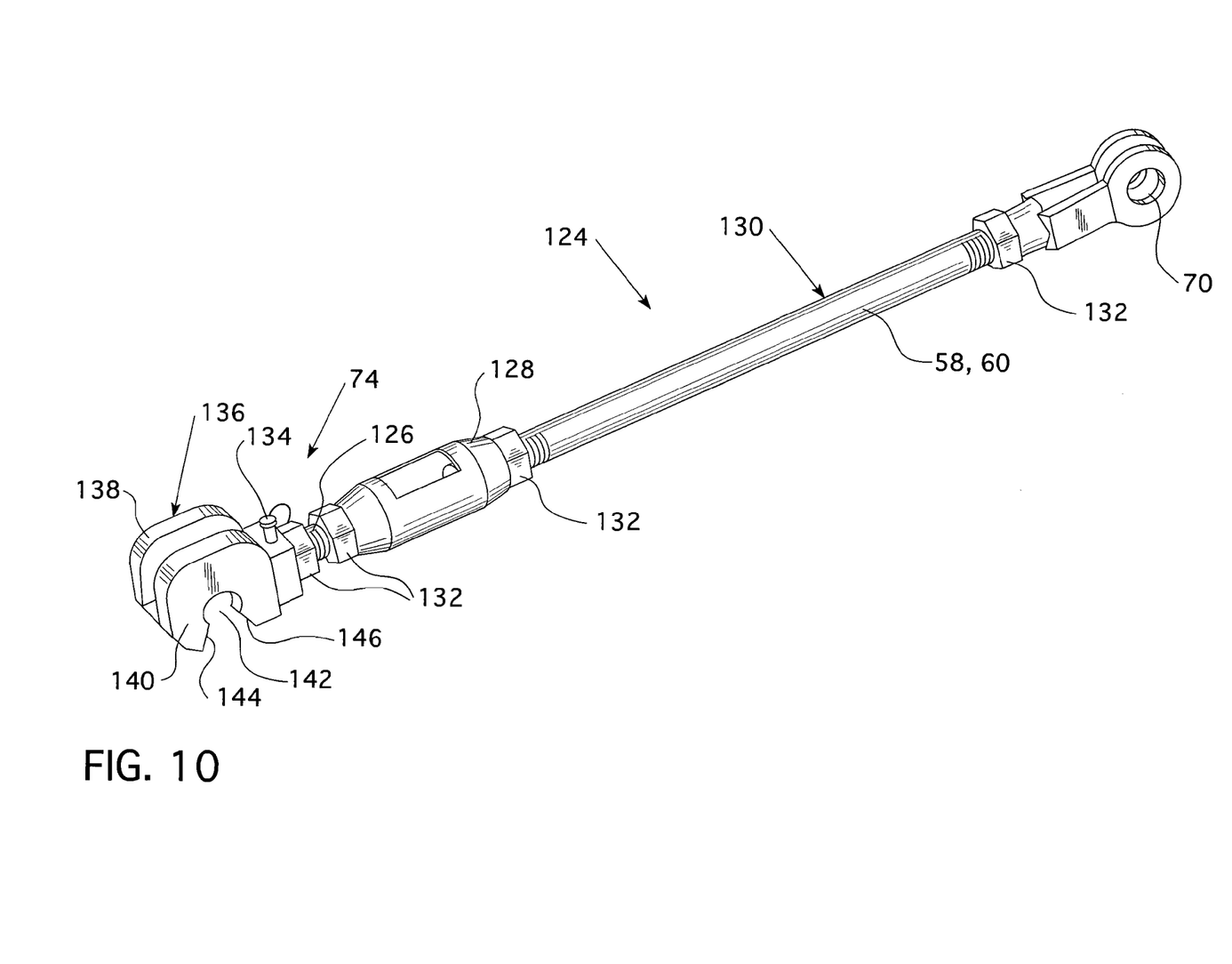
FIG. 10 is a perspective view of a tie rod illustrating another embodiment of this invention that connects with the anchor on the reactor cavity wall.

FIG. 10 is a perspective view of another embodiment 124 of the tie rod 58, 60 employed by this invention. The coupling 70 to the reactor head is the same as that previously illustrated in FIG. 2. The short length of threaded piping 126 and the long threaded rod 130 on either side of the turn buckle 128 that are employed to adjust the length of the tie rod has been reversed from the embodiments illustrated in FIGS. 2 and 4. The hex jam nuts 132 are provided to lock in the adjusted length of the pipe. A set screw 134 on the open end clevis 136 on the distal end of the tie rod prevents the clevis from rotating. The open end clevis 136 has two fork tines 138 and 140 are separated by a distance that will accommodate the anchor plate fitting there between, as will be appreciated from the description to follow. The open end clevis 136 includes a downwardly facing slot 142 that is sized to accommodate a dowel pin that it will fit over. The lower portions 144 and 146 of the vertical walls of the slot 142 are angled to guide the open end clevis 136 over the dowel pins.

Figure 11:
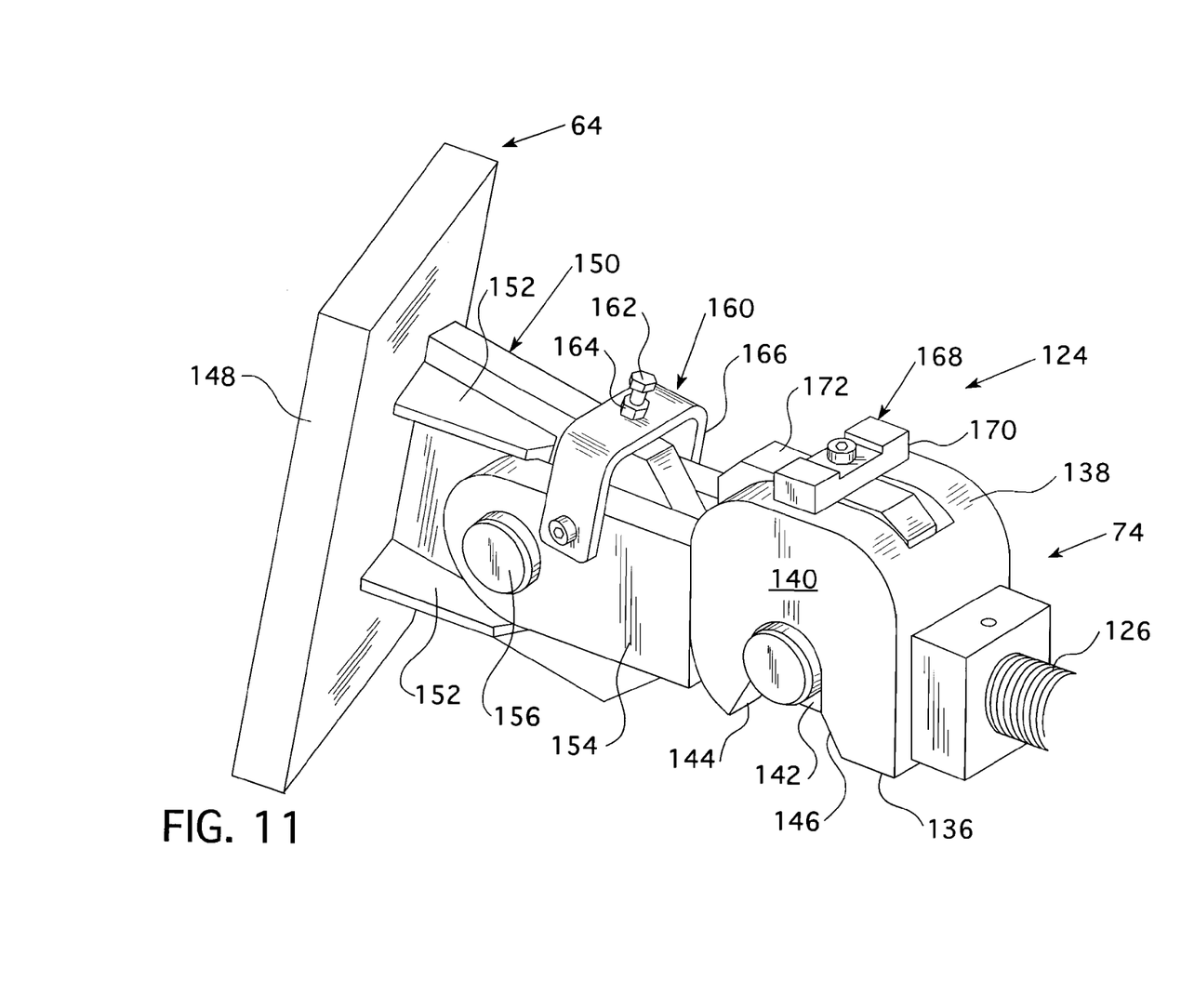
FIG. 11 is a perspective view of the connection interface between the tie rod embodiment of FIG. 10 and the anchor.

FIG. 11 is a perspective view of the coupling between the anchor 64 and the distal ends 74 of the tie rod 58, 60, in accordance with the embodiment 124. The hex jam nut 132 and the set screw 134 has been omitted for convenience. Like reference characters are used for the corresponding components among the several figures. The anchor 64 includes an embedment plate 148 and a laterally extending lug 150 which is reinforced by the gussets 152. The lug 150 is connected to the open end clevis 136 through an extension plate 154 that is pivotably connected to the lug 150 by way of the extension plate pin 156. The extension plate pin 156 enables the extension plate 154 to rotate in a vertical plane to align the clevis pin dowel 158 with the downwardly facing clevis pin slot 142 in the clevis tines 138 and 140. A U-shaped bracket of an angle adjustment arm assembly 160 is connected to each side of the extension plate 154 and spans over the lug 150. Set screw 162 and lock nut 164 adjusts the height of the U-shaped bracket of the angle adjustment arm assembly 160 over the lug 150 and thus raises or lowers the angle of the extension plate 154 until it is in alignment with the tie rod 58, 60. A tie rod locking plate assembly 168 is rotationally connected on top of the extension plate 154. The tie rod locking plate assembly 168 has a locking bar 170, shown in FIG. 11 in the locked position where it sits over the tines 138 and 140, preventing the open end clevis 136 from being dislodged from the clevis pin 158. The locking bar 170 can be rotated 90 degrees over the top 172 of the extension plate 154 to uncover the tines 138 and 140 for removal of the tie rod end 74 from the clevis pin 158.

Figure 12:
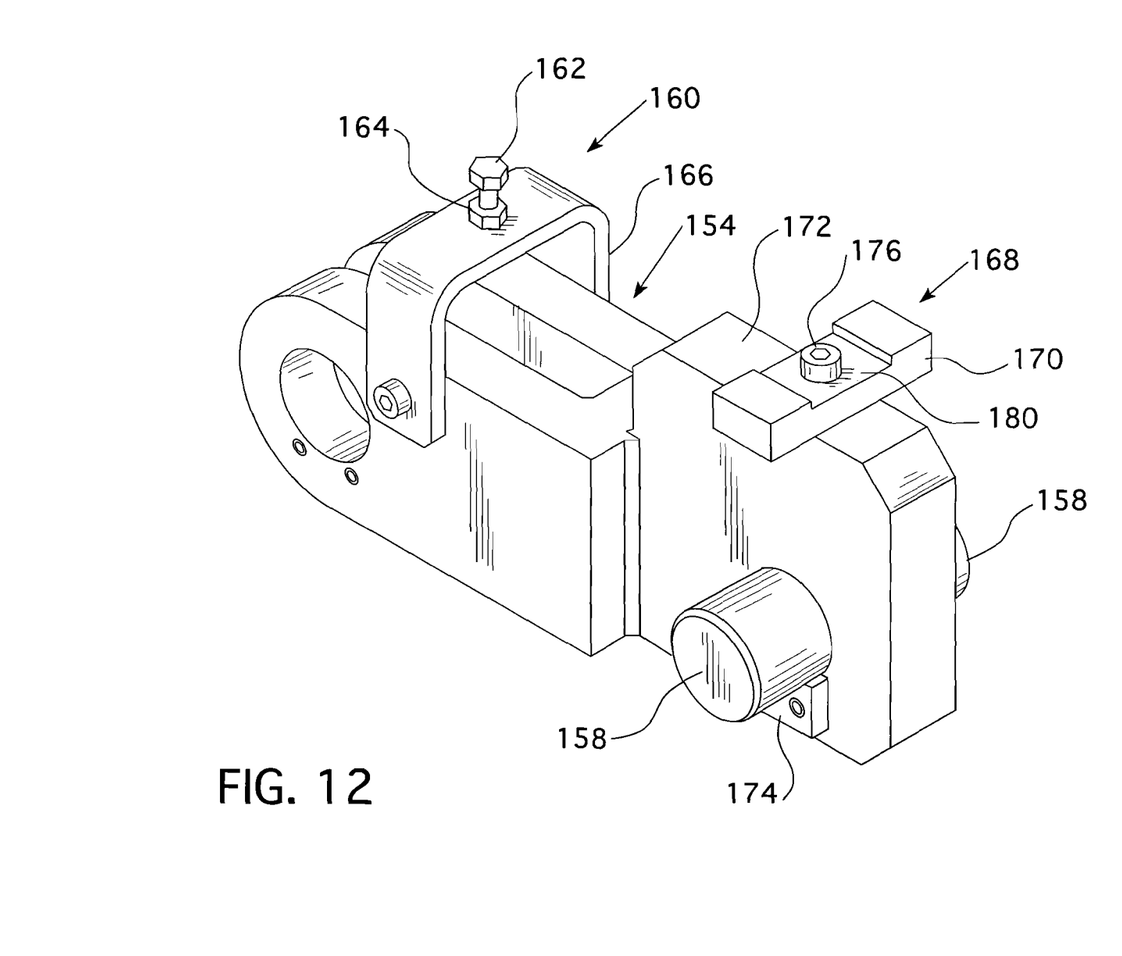
FIG. 12 is a perspective view of the angle adjustment assembly of FIG. 11 that extends between the rigid wall mounted portion of the anchor and the open ended clevis of the tie rod.
Figure 13:
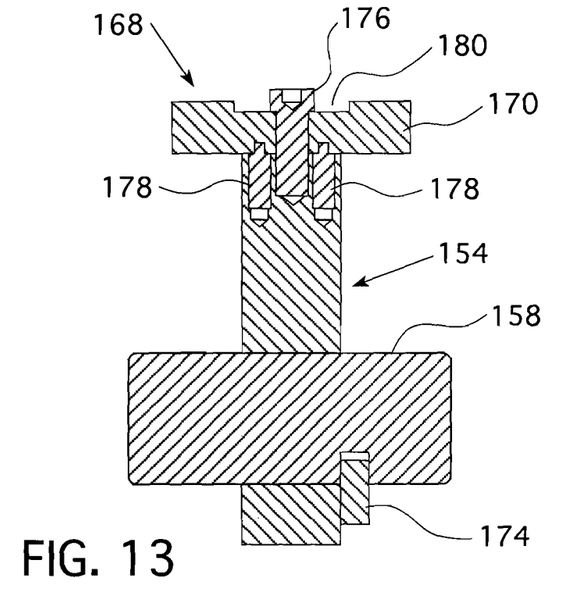
FIG. 13 is a cross-sectional view of the anchor extension plate at the locking bar assembly illustrated in FIG. 12.

FIG. 12 shows the extension plate 154 in more detail. The clevis pin 158 passes through an opening in the extension plate 154 and extends on both sides of the extension plate. As can better be appreciated from FIG. 13, a keeper plate 174 sits within a notch in the clevis pin 158 and is secured by screws to the extension plate to firmly hold the clevis pin 158 in place. The hold down bar 170 is connected to the top of the extension plate 172 by a shoulder screw 176 which is loosely tightened to enable the hold down bar 170 to rotate about the screw 176. As can be seen from FIG. 13, spring plungers 178 which fit in indentations in the underside of a hold down bar 170 engage the hold down bar in the closed position to resist rotation. A similar set of plungers can be provided to engage the underside of the hold down bar 170 when it is rotated 90 degrees to the open position to avoid interference with removal of the tines 138 and 140 from the clevis pin 158 as the tie rod 58, 60 is lifted.

Figure 14:
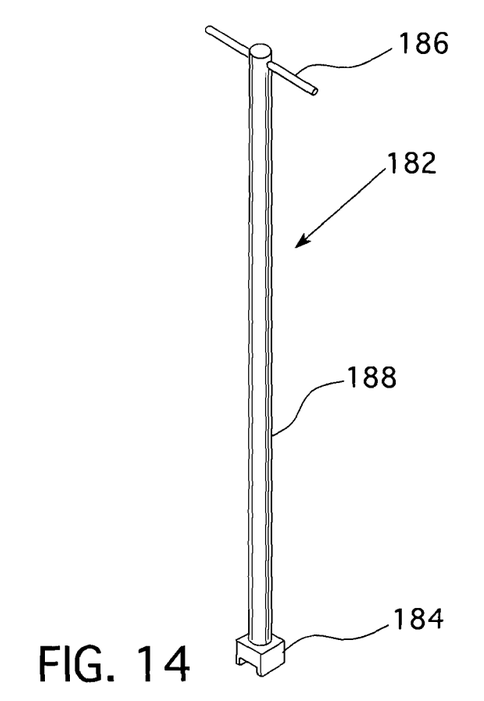
FIG. 14 is a perspective view of the long-handled tool that can be used for actuating the locking bar assembly shown in FIGS. 11-13.

Rotation of the hold down bar 170 between closed and open positions can be achieved through the use of the long-handled hold down tool 182 illustrated in FIG. 14. The hold down tool has a forked end 184 for engaging the recess 180 in the locking bar 170. The forked end 184 is connected through an elongated shaft 188 to a handle 186 which can be turned from the operating deck 52 previously illustrated in FIG. 2.

Accordingly, in addition to eliminating the need for use of a polar crane for this refueling activity, the quick disconnect control rod drive mechanism seismic support tie rod system of this invention eliminates the need for unsafe ladders; eliminates the need for laydown space for the tie rods; and eliminates the potential for the dropping of loose parts.

While specific embodiments of the invention have been described in detail, it will be appreciated by those skilled in the art that various modifications and alternatives to those details could be developed in light of the overall teachings of the disclosure. For example, other attachment configurations between the anchor plates and the tie rod ends that can be engaged and disengaged remotely can be employed without departing from the scope of this invention. Accordingly, the particular embodiments disclosed are meant to be illustrative only and not limiting as to the scope of the invention, which is to be given the full breath of the appended claims and any and all equivalents thereof.

What is claimed is:

1. A nuclear plant comprising:
   a reactor vessel supported within a cavity of a containment facility, the reactor vessel having a detachable head assembly;
   an operating deck within the containment facility located adjacent the cavity;
   an anchor secured to a wall of the cavity;
   wherein the operating deck is configured to support a person servicing the reactor vessel and is spaced from the anchor a distance that will place the anchor out of reach of service personnel when such personnel are positioned on the second segment;
   a plurality of tie rods for supporting the reactor vessel head assembly, at least some of the tie rods having one end connected to the reactor vessel head assembly and another end structured to removably engage and disengage the anchor while the anchor remains secured to the cavity wall; and
   a locking mechanism mechanically attached to the anchor and directly accessible and operable by the service personnel from a location on the operating deck remote from the anchor, to lock or unlock the another end of the tie rod in or from engagement with the anchor.

2. The nuclear plant of claim 1 wherein the locking mechanism includes a mechanically attached latch member that is moveable into a first position to lock the one end of the tie rods to the anchor.

3. The nuclear plant of claim 2 wherein the latch member is moveable into a second position to maintain the locking member in an open state.

4. The nuclear plant of claim 1 wherein the another end of at least some of the tie rods includes a lateral extension that extends from the another end in a first direction and is engaged by a pivotable hook that rotates on the locking mechanism to lock the lateral extension in the anchor when the locking mechanism is in a locked position.

5. The nuclear plant of claim 4 wherein the pivotable hook has a distal end that is spaced from a pivot coupling on the locking mechanism, the distal end being pivotably connected to an actuation arm which is operable from the location on the operating deck remote from the anchor to lock or unlock the another end of the tie rods.

6. The nuclear plant of claim 5 including a stationary arm over which the actuation arm rides wherein the stationary arm has a plurality of holes along a length thereof at least one of which mates with a corresponding hole in the actuation arm when the actuation arm moves the locking mechanism into the locked position and an unlocked position.

7. The nuclear plant of claim 4 wherein the another end of at least some of the tie rods include a second lateral extension that extends from the another end in a second direction that is opposite the first direction and is engaged by a clevis on the locking mechanism.

8. The nuclear plant of claim 7 wherein the clevis is captured between two, spaced brackets on the another end of the tie rod.

9. The nuclear plant of claim 1 wherein the wall in the cavity is a generally vertically oriented wall that extends down from the operating deck into the cavity and is opposed from at least a portion of the reactor vessel.

10. The nuclear plant of claim 9 wherein the anchor is secured approximately a foot to two feet (30.5-61 cm) below the operating deck.

11. The nuclear plant of claim 9 wherein the locking mechanism is directly operable from the operating deck.

12. The nuclear plant of claim 1 wherein the one end of the tie rods are pivotably connected to the reactor vessel so that the tie rods can pivot up into a generally vertical position.

13. The nuclear plant of claim 12 wherein the head assembly includes a winching system for raising and lowering the tie rods.

14. The nuclear plant of claim 11 wherein the anchor includes a plate that extends generally toward the reactor vessel substantially in line with the corresponding tie rod and has a first dowel portion extending laterally from one side of the plate and a second dowel portion extending from an opposite side of the plate, the another end of at least some of the tie rods being formed to slip over and engage the first and second dowel portions from above when the tie rods are pivoted down at the reactor vessel head assembly, the plate having a locking bar that is operable from the location on the second segment of the portion of the containment structure remote from the anchor, to move over the another end of the tie rod when the another end fully engages the first and second dowel portions to lock the another end of the tie rod to the anchor.

15. The nuclear plant of claim 14 wherein the another end of the tie rod is configured as a fork with the tines spaced to receive the plate therebetween, with each tine having a downward facing clevis opening that receives a corresponding dowel portion as the tie rod is pivoted downward.

16. The nuclear plant of claim 14 wherein the locking bar is operable from the second segment of the portion of the containment structure remote from the anchor using a long handled tool.

17. The nuclear plant of claim 16 wherein the locking bar has at least one upwardly extending wall which is gripped by the long handled tool.

18. The nuclear plant of claim 15 wherein the locking bar is rotatably attached to a top of the plate and in an open position lies over the top of the plate clear of the tines of the another end of the tie rod and is rotatable approximately 90 degrees to a closed position where it lies over each of the tines.

19. The nuclear plant of claim 18 wherein the locking bar can be latched in either or both the open or closed position.

20. The nuclear plant of claim 15 wherein at least one wall of the clevis opening has a taper at a lower end.

21. The nuclear plant of claim 1 wherein the anchor includes an engagement interface which is angularly adjustable to align with the corresponding tie rod.

22. The nuclear plant of claim 21 wherein the angular adjustment is in the vertical orientation.

* * * * *